United States Patent
Frisk et al.

(10) Patent No.: US 6,974,612 B1
(45) Date of Patent: Dec. 13, 2005

(54) LAMINATED PACKAGING MATERIAL FOR PAPER CONTAINER

(75) Inventors: Peter Frisk, Tokyo (JP); Norio Kobayashi, Tokyo (JP); Hiroaki Ogita, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/890,155

(22) PCT Filed: Jan. 25, 2000

(86) PCT No.: PCT/JP00/00340

§ 371 (c)(1),
(2), (4) Date: Nov. 9, 2001

(87) PCT Pub. No.: WO00/44632

PCT Pub. Date: Aug. 3, 2000

(30) Foreign Application Priority Data

| Jan. 27, 1999 | (JP) | 11-017804 |
| Jan. 28, 1999 | (JP) | 11-019552 |
| Jan. 29, 1999 | (JP) | 11-021109 |

(51) Int. Cl.$^7$ .................. B32B 27/00; B32B 27/10
(52) U.S. Cl. .................. 428/34.2; 428/34.1; 428/34.3; 428/35.7; 428/36.9
(58) Field of Search .................. 428/34.1, 34.3, 428/35.7, 34.2, 36.9; 229/5.18

(56) References Cited

U.S. PATENT DOCUMENTS

| 4,418,841 A | * | 12/1983 | Eckstein ............... 222/107 |
| 5,536,542 A | * | 7/1996 | Gillespie et al. ......... 428/34.3 |
| 5,732,825 A | * | 3/1998 | Ikenoya et al. ........... 206/484 |

FOREIGN PATENT DOCUMENTS

| JP | 4-97841 A | 3/1992 |
| JP | 5-209116 A | 8/1993 |
| JP | 9-142455 A | 6/1997 |

* cited by examiner

Primary Examiner—Harold Pyon
Assistant Examiner—Marc Patterson
(74) Attorney, Agent, or Firm—Burns Doane Swecker & Mathis LLP (57) ABSTRACT

A paper packaging container is formed from the packaging material comprising constitution layers of at least an outside thermoplastic material layer, a paper substrate layer, and an inside thermoplastic material layer, wherein the inside thermoplastic material layer contains at least a linear low density polyethylene, and has properties parameters of an average density of 0.900–0.930, a predetermined peak melting point, a melt flow index of 5–15, and a swelling ratio of 1.3–1.8. The use of the packaging material allows easy filling and packaging to the packaging container and quick heat sealing, and results in more toughly and strongly sealed container, and the material can be used for achieved good sealing independently of the temperature of food contents and thus maintaining the non-scalping and quality preservability of the content product.

9 Claims, 3 Drawing Sheets

LAMINATED PACKAGING MATERIAL FOR PAPER CONTAINER

TECHNICAL FIELD

This invention relates to a packaging material for paper containers suitable for filling packaging of liquid foods.

In detail, this invention relates to the packaging material for the paper packaging container of brick shape and the paper packaging container of a gable top shape suitable for filling packaging of liquid foods. About the paper packaging container of brick shape, the continuous packaging material is longitudinal-sealed in the longitudinal direction of the packaging material, and the paper packaging material is formed to a tube shape. Products, such as fruit juice, tea, and liquid dairy products, are packed in tube-like packaging material. A transversal seal is formed in the transversal direction of tube-like packaging material for every predetermined interval, and the packaging material is cut along the transversal-seal zone. About the paper packaging container of a gable top shape, paper packaging material is cut in the predetermined shape, and the blanks sealed to container lengthwise is obtained, and after sealing the bottom of the blank, a liquid food product is packed from the top opening, and the upper part is sealed and the packaging container is obtained.

BACKGROUND ART

The packaging container for milk, juice, or other drinks is obtained as follows: For example, paper/plastics laminated packaging material with crease lines are formed to a tube shape by the longitudinal seal of a longitudinal direction. The product is packed in the packaging material formed by the tube shape, the tube-like packaging material is transversally sealed in the transversal direction of the packaging material, and packaging material is formed in the primary shape of a cushion form, or pillow shape, and the packaging material is separately cut at fixed spacing (when packaging material is a web shape), and the packaging material is formed to the final shape by folding of a crease line. The final shape includes a brick shape, a multiple column, a hexagon-head column, tetrahedron shape with four triangular faces, etc.

Furthermore, with the paper packaging container of a gable top shape, a paper packaging material is cut in the predetermined shape, and the blank sealed to container lengthwise is obtained, and after sealing the bottom of a blanks within a filling machine, the product of cow's milk, juice, or other drinks is packed from the top opening, and the upper part is sealed and the container is obtained. The innermost layer of the packaging material corresponding to a transversal-seal portion or/, and a longitudinal-seal portion in the paper containers is heat sealed with the innermost layer of another side, or the outermost layer.

The low density polyethylene (LDPE) by the high-pressure method/printing ink layer/paper (fibrous) substrate layer/LDPE/aluminum foil (Al)/LDPE/LDPE, LDPE/printing ink layer/paper substrate layer/LDPE/LDPE, a printing ink layer/LDPE/paper substrate layer/LDPE/LDPE and LDPE/printing ink layer/paper substrate layer/LDPE/aluminum/polyester (PET) is known about the packaging laminate used for the conventional paper packaging container product. They are also actually used widely currently.

However, LDPE used above is high-pressure method low density polyethylene, the low molecule component contained in the high-pressure method low density polyethylene of an innermost layer bleeds to the food content in the paper container, and if it preserves at a long period of time, it has a risk that the taste of a content may change. Moreover, in the ethylene alpha olefin copolymer obtained using a Ziegler catalyst, the seal temperature is high and the processability is poor. When a lubricant is added in order to improve them, the lubricant will bleed into the food content and will reduce the taste.

The paper container with which linear low density polyethylene (LLDPE) is used for the innermost layer is proposed (JP 62-78059A, JP 60-99647A, etc.). LLDPE is very excellent in a shock intensity, a tear strength, a cold brittleness ability, a heat-sealing intensity, a hot tuck performance, etc. However, since heat-sealing start temperature is somewhat high as compared with LDPE, EVA, or an ionomer, LLDPE may be inferior in the converting properties.

On the other hand, the paper containers which has the innermost layer of the ethylene alpha olefin copolymer (the so-called metallocene PE, mLLDPE) polymerized by the metallocene catalyst are proposed (JP 7-148895A, JP 8-337237A, JP 9-29868A, JP 9-52299A, JP 9-76435A, JP 9-142455A, JP 9-86537A, JP 9-76375A, etc.). It is known that metallocene PE is good for a health performance and can be applied to a container since the metallocene PE has a low-temperature sealability, the film processability, and a narrow molecular weight distribution (WO 93/No. 08221, 44 magazine "plastic" No. 1 60 pages, 39 magazine "chemistry economy" No. 9 48 pages, 44 magazine "plastic" No. 10 83 pages). However, even though Metallocene PE has the low-temperature sealability, no metallocene PE can not necessarily make less bleeding out to the content in the paper container obtained by heat sealing. Moreover, the good performance is not shown in an extrusion laminated properties required for packaging material manufacture, and its converting properties.

If liquid food is fruit juice of citrus fruits etc., non-scalping such as a flavor and tasty, and an oxygen barrier are needed. In the liquid food, oxygen penetrates through the wall of the carton and, for the reason, those nutritional value is lost. In order to reduce permeation of the oxygen to carton and to make degradation of a nutrient like vitamin C into the minimum, usually an aluminum foil layer is added to laminated material.

In addition to above-mentioned packaging material, the strip tape covering the discontinuous section of the innermost layer between two edges of the packaging material in liquid tight can be provided in the paper packaging container formed from above-mentioned packaging material. For example, when forming web-like packaging material to a tube shape by the longitudinal seal of a longitudinal direction, packing the filled product in the packaging material, carrying out the transversal seal of the packaging material in the transversal direction and forming to a brick shape etc. finally, in order to protect the packaging material edge in a longitudinal-seal portion, the level difference section of an innermost layer is covered on a strip tape in liquid tight. Moreover, the hole usually punched at the container wall on top is formed in pouring opening of a packaging container, a spout, and pull tabs. The strip tape (a strip tape patch is included) is attached so that the punched hole may be covered.

As such a strip tape, conventionally, the strip tape of the single layer composition of the low density polyethylene (LDPE) by the high-pressure method, the strip tape which laminated LDPE to both sides on both sides of an intermediate layer's high-density polyethylene (HDPE), the strip tape which laminated LDPE to both sides on both sides of an intermediate layer's polyester (amorphous PET and PET are included), the strip tape with the LDPE laminated on both sides of an intermediate layer's polyethylene vinyl alcohol (EVOH) are used, or are proposed.

Moreover, the various trials in which the practical substitute which changes to aluminum foil is developed have been made. Moreover, it can be scrapped after use, it being provided with the outstanding oxygen gas barrier, and perfume barrier properties. Using the vapor deposited layer of an inorganic oxide for the packaging material for paper containers was proposed (JP,5-28190,Y, JP,8-500068,A, JP,6-93120,A). By the packaging material which has such a gas (oxygen) barrier, the paper container which has a non-scalping or quality keeping ability can be offered. In filling/packing process of liquid food, the surface portion to be sealed is polluted with an oxide by the temperature of the fused extrusion heat in the extrusion lamination step. Moreover, the surface is polluted with remains liquid food. It becomes important in an actual manufacturing process to optimally seal the packaging material to which such a contaminant and an impurity exist in the surface. In the above-mentioned conventional liquid food paper container packaging material, it is difficult to obtain the optimal seal.

In the filling packaging method of a brick shape packaging container, the innermost layer of one edge of packaging material and the outermost layer of the edge of another side are longitudinally sealed for the packaging material of a continuation paper substrate layer with a crease line. The packaging material is formed in the longitudinal direction at a tube shape, and filled liquid food is packed in tube-like packaging material. The innermost layer of tube-like packaging material is sealed with each other under the surface of this liquid food, and the transversal seal of the packaging material is carried out in the transversal direction for every predetermined spacing. The packaging material is cut along with a transversal-seal portion, it forms in primary shape, the packaging material is formed by folding in alignment with the crease line in the final shape of a brick shape, and a packaging container is obtained. It is difficult to obtain a good seal by the filling packaging method, since the packaging material is sealed under the surface of liquid food, liquid food surely remains and the surface is polluted.

Furthermore, since filling liquid food has various quality and properties about temperature, the temperature conditions when filling with and packaging the food are changed broadly, therefore the temperature of the filling step is influenced and is changed in the range also with the large seal temperature in the process of filling and packaging. However, since the heat adhesive resin in the conventional packaging material does not necessarily have the seal properties of a large temperature range, the temperature of a filling content influences and a good seal is not obtained.

Moreover, in the multi-purpose conventional thermoplastic polymer for seals mentioned above, there is a risk that this thermoplastic material layer may melt, a pinhole, foaming, a blister, etc. may happen in some layers, and seal strength may decrease remarkably, and a liquid content may leak from the poor portion, by for example, the elevated-temperature air under the sealing step. If the layer of a thermoplastic material is thickened in order to prevent them, the container cost rises inconveniently.

DISCLOSURE OF THE INVENTION

This invention was made based on an above-mentioned background. The purpose of this invention is offering the packaging material for paper containers for filling packaging of the liquid food in which the packaging material has good performance in the extrusion-laminating properties and the converting properties required in the case of the packaging material manufacture, and the packaging material can be easily manufactured, the packaging material can be quickly heat sealed, the seal is made tougher, the good seal is obtained without the influence from the temperature of a filling content, and the packaging material has a non-scalping or a quality preservability.

Moreover, the purpose of this invention is offering the packaging material for paper containers by which a pinhole, foaming, a blister, etc. do not happen in some thermoplastic material layer under the sealing step, but seal strength's can be maintained, there is no leakage of a liquid content, and the paper container of low cost is manufactured.

The above-mentioned subject is solved by the packaging material for paper containers by this invention. That is, the packaging material for paper containers by this invention relates to a packaging material for paper containers including constitution layers of at least an outermost thermoplastic material layer, a paper substrate layer, a barrier layer, and a thermoplastic material innermost layer, in which each constitution layer is laminated in the above order. The thermoplastic material innermost layer contains at least the linear low density polyethylene which has a narrow molecular weight distribution, and is characterized by having the properties parameter of an average density of 0.900–0.915 (preferably 0.905–0.910), 88–103 degrees C. (preferably 93–103 degrees C.) of a peak melting point, a melt flow index of 5–20, a swelling ratio (SR) of 1.4–1.6, and a 20–50 micrometers (preferably 20–30 micrometers) of a layer thickness.

In the desirable embodiment of this invention, the thermoplastic material outermost layer contains at least the linear low density polyethylene having a narrow molecular weight distribution, and has the properties parameter of the average density of 0.900–0.925, 88 –103 degrees C. (preferably 93–103 degrees C.) of the peak melting point, the melt flow index of 5–20, the swelling ratio (SR) of 1.4–1.6, and 10–25 micrometers (preferably 10–20 micrometers) of the layer thickness.

In another desirable embodiment of this invention, an adhesives layer between the barrier layer and the thermoplastic material innermost layer contains at least the linear low density polyethylene having a narrow molecular weight distribution, and the adhesives layer has the properties parameter of the average density of 0.900–0.915 (preferably 0.905–0.910), 88–103 degrees C. [preferably 93–103 degrees C] of the peak melting point, the melt flow index of 5–20, the swelling ratio (SR) of 1.4–1.6, and 2–15-micrometer of the layer thickness.

In still more nearly another desirable embodiment of this invention, an adhesive thermoplastic material layer between the paper substrate layer and the barrier layer contains at least the linear low density polyethylene which has a narrow molecular weight distribution. The adhesive thermoplastic material layer has the properties parameter of the average density of 0.890–0.925, 88–103 degrees C. (preferably 93–103 degrees C.) of the peak melting point, the melt flow index of 10–20, the swelling ratio (SR) of 1.4–1.6, and 10–25 micrometers (typically 10–20 micrometers) of a layer thickness.

The paper packaging container of one embodiment by this invention is a paper packaging container formed from the packaging material which includes at least constitution layers of a thermoplastic material outermost layer, a paper substrate layer, a barrier layer, and a thermoplastic material innermost layer, and laminates each of the constitution layers in above order. The thermoplastic material innermost layer contains at least the linear low density polyethylene which has a narrow molecular weight distribution, and has the properties parameter of an average density of 0.900–0.915 (preferably 0.905–0.910), 88–103 degrees C. (preferably 93–103 degrees C.) of peak melting point, melt flow index of 5–20, swelling ratio (SR) of 1.4–1.6, and 20–50 micrometers (preferably 20–30 micrometers) of layer thickness.

At least, a sealing-surface layer of a strip tape which covers the discontinuous section of the thermoplastic material innermost layer between two edges of the packaging material in liquid tight contains at least the linear low density polyethylene which has a narrow molecular weight distribution. Furthermore, a sealing-surface layer has the properties parameter of average density of 0.900–0.915, 88–103-degree C. of peak melting point, melt flow index of 5–20, swelling ratio (SR) of 1.4–1.6 (preferably 1.45–1.55), and 20–100-micrometer of layer thickness.

Furthermore, another paper packaging container by this invention is a paper packaging container formed from the packaging material which contains constitution layers of at least an outside thermoplastic material layer, a paper substrate layer, and an inside thermoplastic material layer. The inside thermoplastic material layer contains at least a linear low density polyethylene, preferably a linear low density polyethylene which has a narrow molecular weight distribution preferably, and has the properties parameter of average density of 0.910–0.930 (preferably 0.922–0.927), peak melting point 115 degrees C. or more by the differential scanning calorimetry, melt flow index of 5–15 (preferably 9–11), and swelling ratio of 1.3–1.8 (preferably 1.45–1.55).

BEST MODE FOR CARRYING OUT THE INVENTION

The embodiment of this invention is shown below. The desirable packaging material for paper containers of an embodiment by this invention is the laminate which laminated each constitution layer in following order, including at least the constitution layers of the thermoplastic material outermost layer, the paper substrate layer, the adhesive thermoplastic material layer, the barrier layer (for example, aluminum), and the thermoplastic material innermost layer.

The paper substrate, which can be used in this invention, is a substrate that it is made from kraft pulp and usually has the outstanding strength and low absorptivity. As the kind, there are the bleached paper (FBL), the paper which is not bleached (UBL), the duplex paper (DUPLEX) of FBL and UBL, clay coating paper, multi-layer duplex-paper (MB), etc., and any may be used in this invention.

The paper packaging container of one embodiment by this invention contains the strip tape which covers the discontinuous section of the innermost layer between two edges of packaging material in liquid tight. The packaging material is formed by the longitudinal seal in the longitudinal direction at a tube shape, and a filled product is filled in the packaging material, the packaging material is transversal sealed in the transversal direction, and, finally the packaging material is formed into the shape of a multiple column in the shape of a hexagon-head column etc. to a brick shape. As shown in a FIG. 3, in order to specifically protect packaging material edge 20a in the longitudinal-seal portion of the packaging material 20 and 20 in the above-mentioned case, the level difference section of an innermost layer 26 is covered on the strip tape 27 in liquid tight.

Figure 4:
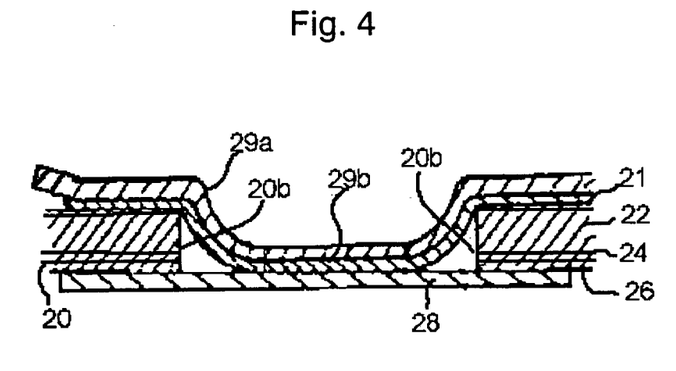
FIG. 4 is an outline sectional drawing showing the lamination of one example of the portion which forms a pull tab in the paper packaging container of this invention.
Figure 5:
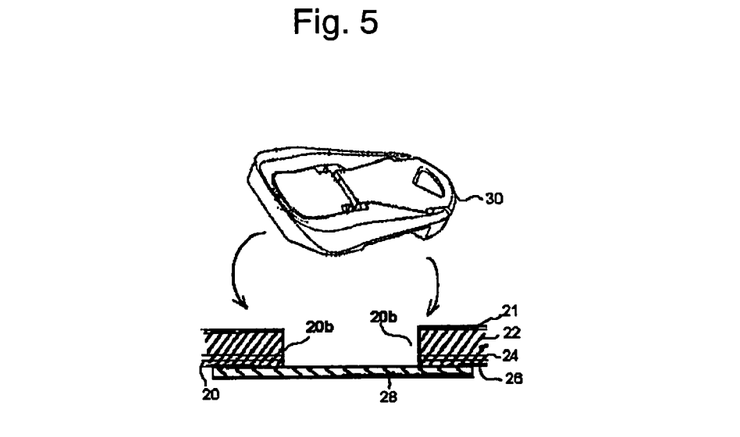
FIG. 5 is an outline sectional drawing showing the lamination of one example of the portion which forms a spout in the paper packaging container of this invention.

Moreover, as shown in a FIG. 4, in order to form the two-layer pull tabs 29a and 29b in a packaging container, punched holes 20b and 20b are formed in a container wall (usually upper surface). So as that the punched holes 20b and 20b may be covered, the strip tape patch 28 seals with an innermost layer 26. Furthermore, as shown in a FIG. 5, in order to form a spout 30 in a packaging container, punched holes 20b and 20b are formed in a container wall (usually upper surface). So as that the punched holes 20b and 20b may be covered, the strip tape patch 28 seals with an innermost layer 26.

The adhesive resin layer used in order to laminate the laminated packaging material of this invention contains at least the linear low density polyethylene which has a narrow molecular weight distribution, and is chosen from LLDPE which has a specific properties parameter, an ethylene vinyl acetate copolymer (EVA), and an ionomer. In the preferable embodiment of this invention, the LLDPE as an adhesives layer between the barrier layer and the thermoplastic material innermost layer contains at least the linear low density polyethylene having a narrow molecular weight distribution, and the LLDPE has the properties parameter of average density of 0.900–0.915, 88–103-degree C. of peak melting point, melt flow index of 5–20, and swelling ratio (SR) of 1.4–1.6, and 2–15-micrometer of layer thickness. By use of the LLDPE, even if it is extruded at an elevated temperature, the thermoplastic material innermost layer can be well-sealed with various barrier layers. By the LLDPE, an extrusion-laminating properties required in the case of packaging material manufacture is improved, good performance is shown in the converting properties by it, and manufacture of packaging material becomes easy.

Moreover, in still more nearly another preferable embodiment, LLDPE as an adhesive thermoplastic material layer between the paper substrate layer and the barrier layer contains at least the linear low density polyethylene which has a narrow molecular weight distribution, and has the properties parameter of average density of 0.890–0.925, 88–103-degree C. of peak melting point, the melt flow index of 10–20, the swelling ratio (SR) of 1.4–1.6, and a 10–25-micrometer of layer thickness. By use of the LLDPE, since the extrusion-laminating properties and converting properties in the case of packaging material manufacture are excellent, manufacture of packaging material laminating can carry out very good.

Furthermore, the coat layer using the synthetic resin of ethylene vinyl acetate the copolymer (EVA) which has a metal and an adhesive property by the extruding lamination method, or the ionomer (IO) which cross linked the bridge by the metal ion in between the molecules of an ethylene vinyl-methacrylate copolymer can also be laminated as the adhesive layer. About 10–50 micro is suitable for the thickness of the adhesives layer. Preferably, the adhesives layer is EVA or IO of 10 micro–18 micro of layer thickness.

The packaging material for paper containers by this invention can contain at least the printing ink layer provided in the outside surface of the semi material which does not laminate the resin outermost layer yet, or the ink layer formed in the outside surface of a sealable outside resin layer. The ink has the water or oily ink for flexographic printings, the oily ink for gravure, hardenable ink for offset printing, etc. In the embodiment of the preferable packaging material for paper containers of this invention, the ink layer contains common components (for example, imine compounds etc.) in part with the component contained in the anchor agent layer in contact with the ink layer.

In the packaging material for paper containers of this invention, the thermoplastic material layer which the packaging material outside surface laminated is included. The material layer comprises of polyolefin resin, such as polyethylene, polypropylene, and ethylene copolymer, and has a coextrusion film containing the linear low density polyethylene (LLDPE) excellent in the resistance (oil resistance, acid resistance, infiltration resistance, etc.) for a content, the medium density polyethylene, and polyethylene as well as low density polyethylene (LDPE).

In the preferable embodiment of this invention, the thermoplastic material outermost layer contains at least the linear low density polyethylene which has a narrow molecular weight distribution, and it has the properties parameter of average density of 0.900–0.925, 88–103 degrees C. (preferably 93–103 degrees C.) of peak melting point, melt flow index of 5–20, swelling ratio (SR) of 1.4–1.6, and a 10–25 micrometers (preferably 10–20 micrometers) of layer thickness. In case the innermost layer of one edge of the web-like packaging material which contains a paper substrate layer with crease lines, and the outermost layer of the edge of another side are sealed longitudinally in layers and the material is formed in the longitudinal direction at a tube shape, by using this material, an innermost layer and the outermost layer can be quickly heat sealed by the broader-based temperature range, and tougher seal strength is made possible.

In the embodiment of the packaging material for paper containers of this invention, it has a barrier layer in the inside laminate of the above-mentioned packaging material. A barrier layer comprises of at least one chosen from aluminum foil, a metal/inorganic oxide thin film, the ethylene vinyl alcohol copolymer layer (EVOH layer), the nylon layer, the polyvinylidence chloride film, and the polyvinylidence chloride coat film. As for the vapor deposited film of the inorganic oxide of the barrier layer, the thin film layer (100–5000 Å in thickness (preferably 200–1000 Å)) of inorganic oxides, such as the silicon oxide, a tin oxide, zinc oxide, an indium oxide, a titanium oxide, and aluminum oxide, is formed in the surface of a thermoplastic resin film with a thickness [, such as a polyolefin, nylon, polyester, and polyvinyl alcohol] of about 10–30 micro of vacuum deposition, sputtering, the chemical vacuum deposition, the plasma-chemistry vapor deposit (PCVD), etc.

The usual aluminum metal can be used as aluminum which constitutes the aluminum foil of a barrier layer, or the thin film layer of aluminum. In this embodiment, there is the method of forming the vapor deposited film by vacuum deposition methods, such as the ion beam method and an electron beam method, the sputtering method, etc. as a method of forming the thin film layer of aluminum.

In order to obtain sufficient shading performance, usually, the thickness of the thin film layer of the above-mentioned aluminum is preferably 10 nm–200 nm, and is more preferably 20–150 nm in this invention.

In the above, all light transmissions fall as the thickness of the thin film layer of aluminum becomes thick. If the shading performance of the printing layer is not taken into consideration, the thickness of the thin film layer of aluminum is set to approximately 80 nm and all light transmissions will become 0%.

In this invention, the thickness of the thin film layer of aluminum is adjusted according to necessary physical properties etc., corresponding to the existence of a final packaging form and a printing layer, and its location.

Reading the barrier layer which can be used in this invention, the film of the resin may contain barrier resin layers, such as EVOH and polyvinyl alcohol, and the resin film which has the vapor deposited film of an inorganic oxide, or the vapor deposited film of aluminum. The resin film includes the film of polyester resins, such as a polyethylene-terephthalate film and a polybutylene-terephthalate film, polyamide-resin films, such as nylon6 films, 66 nylon films, 610 nylon films, 612 nylon films, 11 nylon films, 12 nylon films, and a polyamide film by the condensation of a meta-xylene diamine, a polycarbonate resin film, polyolefin resin films, such as polyethylene and polypropylene, a poly vinyl alcoholic resin film, and ethylene-vinyl acetate copolymer film, a polyvinyl chloride resin film, polyvinylidence chloride resin film, polystyrene resin film, poly (meta) acrylate resin film, poly acrylic nitrile resin film, polyacetal resin film, fluororesin film, and other resin films.

In this invention, a silicon oxide (SiOx), aluminum oxide, an indium oxide, tin oxide, a zirconium oxide, etc. can be used as an inorganic oxide which constitutes the thin film layer of an inorganic oxide, for example. Furthermore, in this invention, an inorganic oxide may be the mixture of silicon monoxide and silicon dioxide, or a mixture of silicon oxide and aluminum oxide.

In this invention, the methods of forming the thin film layer of inorganic oxide are the methods of forming the vapor deposited film by vacuum deposition methods, such as the ion beam method and an electron beam method, the sputtering method, the plasma-chemistry vacuum deposition (the PCVD method), etc. In the above, in order to obtain sufficient barrier performance, usually, the thickness of the thin film layer of an inorganic oxide is 10 nm–200 nm, and is preferably 20–150 nm in this invention. When the thickness of the thin film layer of an inorganic oxide exceeds 150 nm, especially 200 nm, there are risks of decline of the barrier the performance by the crack and bend of the thin film layer of an inorganic oxide, and also there are troubles of expensive material cost.

Preferably, the barrier layer mentioned above is a 5–15-micrometer thin layer, and has the oxygen permeability of under 5 cc/m$^2$ 24 hr atm (23 degree-C. 85% RH).

In this invention, the thermoplastic material innermost layer contains at least the linear low density polyethylene which has a narrow molecular weight distribution, and has the properties parameter of average density of 0.905–0.910 (preferably 0.900–0.915), 88–103 degrees C., peak melting point (preferably 93–103 degrees C.), melt flow index of 5–20, swelling ratio (SR) of 1.4–1.6, and 20–50 micrometers (preferably 20–30 micrometers) of layer thickness.

In the preferable embodiment of this invention, the linear low-density-polyethylene content polymer of a sealable innermost layer has swelling ratio (SR) of 1.4–1.6. The above-mentioned parameter is describbed more concretely. The "swelling and swell" indicate the phenomenon in which a cross-sectional area increases immediately after extrudes comes out of a die orifice, and the volume of the whole extrudes increases. The swelling ratio in this invention indicates the transversal dimension of the extrudes out of the die measured on the same conditions as the measurement conditions in the JIS test method for melt-flow-rate (MFR) measurement (namely, expansion coefficient of a diameter).

In another embodiment of this invention, an inside thermoplastic material layer contains at least linear low-density-polyethylene, preferably the linear low density polyethylene having a narrow molecular weight distribution. Furthermore, the inside thermoplastic material layer has the properties parameter of average density of 0.910–0.930 (preferably 0.922–0.927), the peak melting point of 115 degrees C. or more by the differential scanning calorimetry, the melt flow index of 5–15 (preferably 9–11), and swelling ratio of 1.3–1.8 (preferably 1.45–1.55, more preferably about 1.5). Regarding the peak melting point by the differential scanning calorimetry, in case of one peak, exceeding 115 degree C. of the peak melting point and 0.920 or more of average density are required, and if it is two or more peaks, 0.915 or more of average density and exceeds 115 degrees C. of peak melting points for one of those peaks are required.

The thermoplastic material innermost layer contains the blend polymers which contain at least the linear low density polyethylene (mLLDPE) which has the narrow molecular weight distribution, which is polymerized using the metallocene catalyst. About the mLLDPE, the ethylene alpha-olefin copolymer which comprises to polymerize using the so-called metallocene catalyst can be used. To the conventional catalyst with the uneven active site of the conventional catalyst being called multi-site catalyst, since the active site is uniform, the metallocene catalyst is also called single site catalyst.

Specifically, the resin of mLLDPE contains the ethylene alpha-olefin copolymer which is polymerized using metallocene catalysts, such as a trade name "AFFINITY" by the trade name "EXACT" by the trade name "KERNEL" by Mitsubishi Chemical, Inc., the trade name "EVOLUE" by Mitsui Petrochemical Industries, Ltd., the U.S., and the Exxon chemical company, the U.S., and the Dow Chemical Co., and a trade name "ENGAGE."

In this invention, as long as the above-mentioned properties parameter is shown, resins other than the mLLDPE resin can be used. Moreover, when it is difficult to obtain the above-mentioned properties parameter by mLLDPE sole, other polymer components can be blended.

The above-mentioned other polymer is thermoplastic resins, such as polyolefin resin, such as polyethylene, polypropylene, and an ethylene copolymer, and a polyester resin. They are the low density polyethylene (LDPE) used conventionally, a linear low density polyethylene (LLDPE) excellent in the resistance (oil resistance, acid resistance, infiltration resistance, etc.) over a content, a medium density polyethylene, the coextrusion resin containing polyethylene, etc.

The density of the low-density polyethylene blended above is 0.91–0.93 g/cm$^3$. The molecular weight is 1×10$^2$ to 1×10$^8$, and the melt flow rate (MFR) is 0.1–20 g/10 min. In addition, an additive-free material is used fundamentally. However, according to applications, various additives, such as an antioxidant, a ultraviolet absorber, an antistatic agent, lubricant, an anti blocking agent, a flameproofing agent, inorganic and an organic filler, a coating material, and a pigment, may be added suitably.

The metallocene catalyst of mLLDPE is characterized by a polymerization active site being single (single site). The ethylene alpha-olefin copolymer which is polymerized using the catalyst has the outstanding properties which is not acquired in the ethylene alpha olefin copolymer obtained using the multi-site catalyst of the conventional Ziegler catalyst.

As a typical thing of a single site catalyst, there are a metallocene catalyst and the so-called Kaminsky catalyst. The metallocene catalyst is a catalyst which comprises of a metallocene transition-metal compound and an organoaluminium compound. As a metallocene transition-metal compound, although a zirconium compound, a titanium compound, a silica compound, etc. are mentioned, this invention is not limited to them. Moreover, although, as for an organoaluminium compound, an alkyl aluminum and linear/cyclo-alminoxane are mentioned, this invention is not limited to them. Although the polymerization method has a solution-polymerization method, a vapor-phase-polymerization method, a slurry polymerization method, etc., this invention is not limited to these.

As for the alpha olefin of the comonomer in copolymerization with ethylene, butene-1, hexene-1,4-methyl pentene 1, and an octene 1 are mentioned. The alpha olefins may be used sole and may be used as the mixture.

The preferable mixing ratio of ethylene and alpha olefin is 1–20 wt. %. Desirably, the density of the polymerized ethylene alpha olefin copolymer is 0.900–0.915 g/cm$^3$, and is preferably 0.905–0.910 g/cm$^3$. It is because the roll separation performance in the time of film forming and the slipping performance of film become bad if smaller than 0.900 g/cm$^3$. Moreover, it is because the plasticity and low-temperature sealability of film are inferior and seal performance falls by the density higher than 0.915 g/cm$^3$. The molecular weight is 1×10$^3$ to 1×10$^6$, and melt flow rate (MFR) is 3.0–30 g/10 min (preferably 10–20 g/10 min). The peak melting point is 88–103 degrees C. (preferably 93–103 degrees C.).

In addition, various kinds of antioxidants, a ultraviolet absorber, an antistatic agent, lubricant, an anti blocking agent, a flameproofing agent, inorganic and an inorganic filler, a dye, a pigment, etc. may be suitably added by ethylene alpha-olefin copolymer. The low density polyethylene is obtained using the conventional multi-site catalyst which is a Ziegler catalyst, and is not limited to especially the kind or the polymerized method of a catalyst in this invention.

The packaging material for paper containers of the preferable embodiment of this invention contains at least the linear low density polyethylene which has a molecular weight distribution with a narrow innermost layer and, has the properties parameter of average density of 0.900–0.915 (preferably 0.905–0.910), 88–103 degrees C. (preferably 93–103 degrees C.) of peak melting point, melt flow index of 5–20, swelling ratio (SR) of 1.4–1.6, and a 20–50 micrometers (preferably 20–30 micrometers) of layer thickness.

As mentioned above, there is an ethylene alpha-olefin copolymer which is polymerized using a metallocene catalyst as the thermoplastic material innermost layer. The mixture which contains, in this invention, the ethylene alpha-olefin copolymer which is polymerized using the metallocene catalyst, and the low density polyethylene which is polymerized using the multi-site catalyst, in a preferable embodiment, can be used. Any layers other than the innermost layer of a paper container are not limited.

The blending ratio of components required in order that the ethylene alpha olefin copolymer polymerized and obtained with the metallocene catalyst may maintain seal performance, such as salability, and shock resistance is 50 wt. % or more (preferably 55–75 wt. %, more preferably 55–65 wt. %). Seal performance or shock resistance good at less than 50 wt. % are not obtained, and workability and laminated performance decline at 65 wt. %.

A blending ratio required to heighten fused tension, such as the film moldability of the low density polyethylene from multi-site catalytic polymerization, is 50 or less wt. % (preferably 45–25 wt. %, more preferably 45–35 wt. %).

If the above-mentioned range is exceeded, since good seal performance and good shock resistance will not be obtained, it is not desirable.

Optional methods can be used for the methods of adjusting the above-mentioned resin, for example, they include the method of kneading by the biaxial kneading extruder, the roll mill, the Banbury mixer, etc., after blending each component and mixing by the blender, the mixer, etc., the dry-blend method in which mixed with pellets.

In the preferable embodiment, it is characterized by including ethylene alpha-olefin copolymer from metallocene catalytic polymerization, and the low density polyethylene from multi-site catalytic polymerization. The ethylene-alpha olefin copolymer which is polymerized with the metallocene catalyst shows a characteristic narrow molecular weight distribution (Mw/Mn<=3), i.e., a narrow composition distribution, and is uniform polymer in molecular structure. About the physical properties, the characteristic which is excellent in a tensile strength, an impact strength-proof, a tear strength, and a low-temperature sealability is kept, and a molecular tangle becomes large with the properties of the high fused tension which is one of the characteristics of the low density polyethylene from multi-site catalytic polymerization. Therefore, film moldability and an impurity sealability can be improved.

Moreover, since extrusion film-forming performance is good, concentration of additives, such as lubricant, is made low. By the low concentration, the paper container which has the reduction of hindrance against the seal performance, maximization of the characteristic of seal performance, reduction of influence to the taste of the content food by the additive, and the outstanding content protection performance can be obtained.

In the liquid food filling field which carries out this invention, web-like paper packaging material is formed in the longitudinal direction at a tube shape, filled products, such as fruit juice, tea, and liquid dairy products, are packed in tube-like packaging material, tube-like packaging material is transversal sealed for every predetermined spacing in the transversal direction, packaging material is cut along with a transversal-seal portion, and a brick shape paper packaging container is obtained. Moreover, paper packaging material is cut in a predetermined configuration, the blanks which is sealed to container lengthwise is obtained, after sealing the bottom of the blanks, the filling liquid product is packed from top opening, the upper part is sealed, and the paper packaging container of a gable top shape is obtained.

The example of the paper container in this invention includes the container made of a converted paper (containers, such as a dress type, a two-piece type, and a three-piece type), a composite can, an insert molding container, a double container, etc. In the above case, the packaging material is punched as the expansion plan of a paper container, and after carrying out creasing-line processing, the packaging material is formed by the paper container of various forms by folding and sealing along with a creasing line. As the seal method, there are heat sealing, a flame seal, a hot-air seal, an ultrasonic seal, a high-frequency-induction-heating seal, etc. The laminates are supplied to a roll shape, a sleeve shape, or a cup shape, after being filled with a content, laminates are sealed using the various above-mentioned seal methods, and a paper container is formed in the filling machine.

The manufacturing method of the packaging material for paper containers by this invention is described below.

The lamination method of usual packaging material includes a wet lamination-process, dry lamination-process, and non-solvent type dry lamination process, an extrusion lamination process, the T die coextrusion forming method, a coextrusion lamination process, a film blowing, others, etc. In this invention, if required at the above-mentioned lamination, pretreatment of, for example, a corona treatment, ozonization, etc. can be carried out to the film. For example, anchor-coat agents, such as isocyanate (urethane), polyethylene imine, poly butadiene, and organic titanium, lamination adhesives, such as polyurethane, poly acrylic, polyester, epoxy, polyvinyl acetate, and cellulose, well-known anchor-coat agents, etc. can be used.

As mentioned above, in this invention, although the various lamination methods are possible, in case packaging material is manufactured using an extruding lamination process, more merits by this invention can be obtained in the laminated packaging material by this invention.

In the preferable embodiment by this invention, since the resin to be extruded and laminated has the properties parameter adjusted the optimal in the average density, the peak melting point, the melt flow index, the swelling ratio, and the layer thickness, and, for the reason, the extrusion-laminating properties and the good converting properties in packaging material manufacture are shown.

In the manufacturing method of packaging material, more than the thermoplastic material outermost layer, the adhesives layer, the adhesive thermoplastic material layer, and the thermoplastic material innermost layer concerning this invention, an extrusion resin material, which constitutes the adhesive extruded layer, can be used. The material includes polyethylene, ethylene alpha-olefin copolymer, polypropylene, polybutene, poly isobutene, polyisobutylene, polybutadiene, polyisoprene, ethylene methacrylic-acid copolymer, copolymer of ethylene, such as ethylene acrylic acid copolymer, and unsaturated carboxylic acid, acid modified polyolefine resin, an ethylene ethyl acrylate copolymer, ionomer resin, ethylene vinyl acetate copolymer, etc.

Moreover, specifically, the adhesives of the adhesives layer in the case of using the dry-laminate method include urethane adhesives used in dry laminate etc., polyester urethane adhesives, polyether urethane adhesives, acrylic adhesives, polyester adhesives, polyamide adhesives, polyvinyl acetate adhesives, epoxy adhesives, rubber adhesives, etc.

Figure 1:
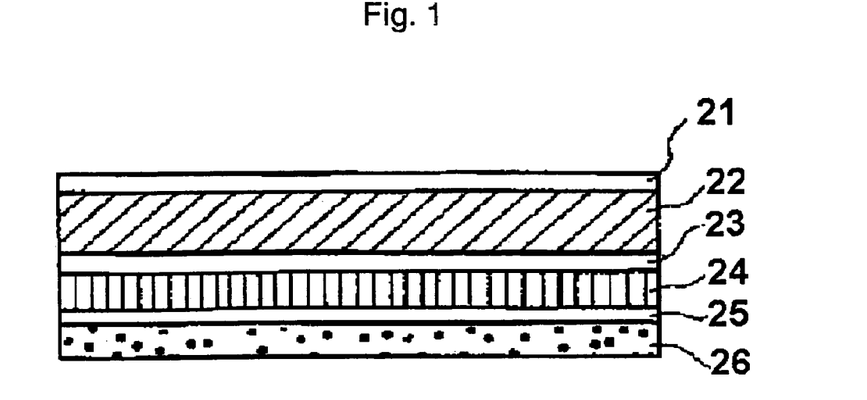
FIG. 1 is an outline sectional drawing showing the lamination of one example of the packaging material for paper containers of this invention.

An example of the packaging material by this invention is shown in FIG. 1. The packaging material of the example comprises of constitution layers of the thermoplastic material outermost layer 21, the paper substrate layer 22, the adhesive thermoplastic material layer 23, the barrier layer 24, the adhesives layer 25, and the thermoplastic material innermost layer 26.

The packaging material is packaging material with crease lines. The packaging material is formed by the tube shape by the longitudinal seal of a longitudinal direction, and a liquid food product is packed in the tube shape formed packaging material, the transversal seal of the tube-like packaging material is carried out in the transversal direction, the packaging material is formed by the primary shape of a pillow, is separately cut by fixed spacing, is fold along with crease lines, and is formed to the final brick shape.

Figure 2:
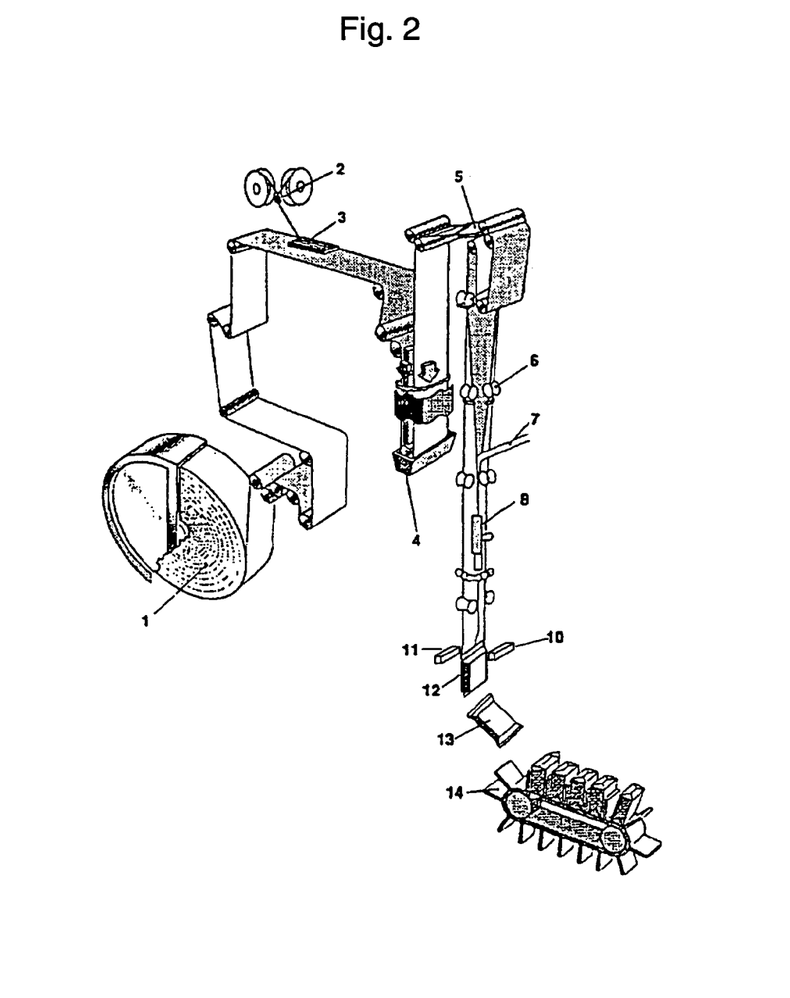
FIG. 2 is a skeleton drawing of the filling machine which uses the packaging material for paper containers of this invention.

The outline of an example of the filling machine, which is used for the laminated packaging material according this invention, is shown in FIG. 2. In the filling machine shown in this example, the roll shape packaging material web 1 having a thermoplastic material innermost layer is wound-out, and is conveyed with rollers into inside of the filling machine. By the strip tape applicator 3, the strip tape 2 is sealed to the end of a packaging material web. The packaging material web passes through the inside of a sterilization agent bath 4, it is sterilized, and the air knife 5 removes a sterilization agent. The packaging material is formed to a tube shape with the forming roller 6. Liquid food is packed from the filling pipe 7 in the tube, and packaging material is sealed in the longitudinal direction by the longitudinal-seal element 8. The packaging material is fastened by a seal jaw 10 and counter jaw 11 in a heat-sealing equipment, sending this tube below by the length equivalent to one packaging container. Simultaneously, the packaging material is heat sealed in the transversal direction, and is continuously formed in the letter packaging container 12 of a pillow. Succeeding, the cutting schedule portion of the seal zone of the connecting pillow type packaging container is cut, and the packaging material is separated with a knife etc. in each packaging filling container 13 on the down stream. The flap of the upper and lower sides of the separated container 14 is folded, and the container is formed in the packaging filling container 11 of the final form with the final folder 14.

In another example which manufactures the paper container of this invention, the blank plates for paper containers with the creasing line of the predetermined shape of the packaging material by this invention are punched, subsequently, the edges of a blank plate are welded and containers are manufactured. The container is put into a filling machine, the bottom portion is folded along with a predetermined creasing line, and a heat-sealing bottom is formed by hot-air processing. A food content is packed from top opening, the top portion can be folded along with a predetermined creasing lines, the top part can be heat sealed by hot-air processing, the gable top type top part can be formed, and a packaging product container can be manufactured. The example given above is illustration of the container for packaging concerning this invention, and this invention is not limited by them.

Figure 3:
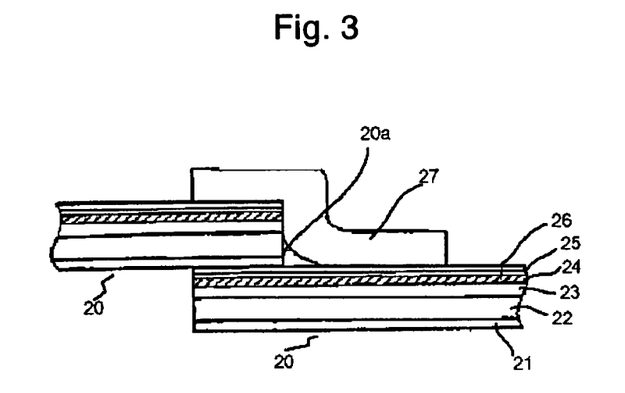
FIG. 3 is an outline sectional drawing showing the lamination of one example of the longitudinal-seal portion of the paper packaging container of this invention.

Although the embodiment which protects a packaging material edge on a monolayer strip tape is shown in FIG. 3, a strip tape can be made into a laminate in this invention. The figure of partial breakdown of the example is shown in FIGS. 6(A) and (B). The strip tape comprises of a laminate of the central layer 32 of a high density polyethylene (HDPE), and the both-sides layer 31 and 32 of the sealing-surface layer from this invention, in the embodiment of (A). Moreover, the strip tape comprises of a laminate of the polyester (PET) central layer 32, and the two-layer both-sides layers 31a, b, 33a, b of the sealing-surface layer by this invention, in the embodiment of (B).

Although the container for packaging concerning this invention can apply liquid products, such as cow's milk, a lactic-acid-bacteria drink, liquid soup, a fruit-juice drink, barley tea, green tea, oolong tea, liquor, a seasoning, medical supplies, cosmetics, a coating material, adhesives, ink, a developer, and an etching reagent, to packaging, it is preferably the container for liquid food.

EXAMPLE

The following examples describe this invention concretely.

Example 1-1

The linear low density polyethylene (mLLDPE) of the narrow molecular weight distribution which is polymerized with the metallocene catalyst and the low density polyethylene by the high pressure process were blended. Fusion extruding of the layer of the blended adhesives of average density of 0.910, 97-degree C. of peak melting point, melt flow index of 15, swelling ratio of 1.5, and 13-micrometer of layer thickness was carried out to the whole surface of aluminum foil with thickness of 9 micrometers. The linear low density polyethylene (mLLDPE) having the narrow molecular weight distribution which was polymerized with the metallocene catalyst, and the low density polyethylene by the high pressure process were further blended. The thermoplastic material innermost layer obtained with the blend of average density of 0.907, 96-degree C. peak of melting point, melt flow index of 14, swelling ratio of 1.5, and 25-micrometer of layer thickness was laminated, and the laminated film which comprises of aluminum foil/blended adhesives layer/thermoplastic material blended innermost layer was prepared.

Simultaneously, low density polyethylene (density=0.920 g/cm$^3$, MI=5.1) by the high pressure process was extrusion coated by 330 degrees C. of extrusion temperatures on the paper substrate (weight=320 g/m$^2$) by 20 micrometers in thickness, and the thermoplastic material outermost layer was laminated. Subsequently, linear low density polyethylene (mLLDPE) of the narrow molecular weight distribution which was polymerized with the metallocene catalyst, and the low density polyethylene by the high pressure process were blended. Between the paper side of the low density polyethylene/paper substrate, and the aluminum foil side of the aluminum foil laminate, fusion extruding of the adhesive thermoplastic material layer of the blend of average density of 0.920, 99-degree C. peak melting point, melt flow index of 17, swelling ratio of 1.5, and 12-micrometer layer thickness was carried out, the thermoplastic material layer was laminated, and the laminated web packaging material having laminated structure of being shown in FIG. 1 was obtained.

The liquid food-packaging container of brick shape was obtained by the filling machine shown in FIG. 2, using the packaging material. About the obtained packaging container, the seal temperature range of the longitudinal seal in the filling machine, the temperature range of a transversal seal, and seal strength were evaluated.

Example 1-2

Packaging material and the brick type paper container were produced like the example 1-1 except having used the thermoplastic material which blended the linear low density polyethylene (mLLDPE) of the narrow molecular weight distribution which was polymerized with the metallocene catalyst, and the low density polyethylene by the high pressure process instead of the low density polyethylene by the high pressure process of the thermoplastic material outermost layer in an example 1-1. The blended thermoplastic material had average density of 0.915, 95-degree C.

of peak melting point, melt flow index of 17, swelling ratio of 1.5, and 18-micrometer of layer thickness. Furthermore, the same evaluation as the above-mentioned example was performed about the obtained paper container and packaging filling. The pattern encaustic color printed by paper-layer external surface penetrated the transparent thermoplastic material outermost layer, and was vividly viewed from the outside with gloss.

Example 1-3

The packaging material and the brick type paper container were produced like the example 1-1 except having used for a 8-micrometer polyester film the barrier film which vapor deposited the silicone oxide (SiOxCy) by the plasma enhanced chemical vapor deposition instead of the aluminum foil in an example 1-1. Furthermore, it is similarly estimated as an example about the obtained paper container and packaging filling.

Comparative Example 1-1

The packaging material and the brick type paper container were produced like the example 1-1 except having used the low density polyethylene (density=0.920 g/cm$^3$, MI=5.1) by the high pressure process for the thermoplastic material innermost layer and adhesives layer in an example 1-1. Furthermore, the same evaluation as the above-mentioned example was performed about the obtained paper container and packaging filling.

Comparative Example 1-2

The packaging material and the brick type paper container were produced like the example 1-1 except having used a low density polyethylene (density=0.920 g/cm$^3$, MI=5.1) by the high pressure process for the adhesives layer in an example 1, and having used a film which was made from the low density polyethylene by the film blowing and the adhesive resin for the thermoplastic material innermost layer in an example 1. Furthermore, the same evaluation as the above-mentioned example was performed about the obtained paper container and packaging filling.

Comparative Example 1-3

The packaging material and the brick type paper container were produced like the example 1 except having used the thermoplastic material which blended the linear low density polyethylene (mLLDPE) of the narrow molecular weight distribution which polymerized with the metallocene catalyst, and the low density polyethylene by the high pressure process instead of the thermoplastic material of the innermost layer in an example 1-1. The blended thermoplastic material had average density of 0.915, 95-degree C. of peak melting point, melt flow index of 17, swelling ratio of 1.3, and the 18-micrometer of layer thickness. Furthermore, the same evaluation as the above-mentioned example was performed about the obtained paper container and packaging filling.

Evaluation about the seal temperature range of the above-mentioned longitudinal seal, the temperature range of a transversal seal, and seal strength was performed for an example 1-1, 1-2, 1-3, and a comparative example 1-1, 1-2 and 1-3. Consequently, it was proved that the examples are superior to comparative examples.

For example, comparison of the example 1-2 and the comparative example 1-2 proved that the seal temperature range of the longitudinal seal expanded in 80% or more to low temperature side, and good sealability was shown, and the temperature range of a transversal seal expanded 20% or more, and the seal at the time of packaging filling became more easily and simple in the example 1-2. Furthermore, when the example 1-2 was compared with the comparative example 1-2 about the seal strength of a transversal seal, the strength will have been improved 30 to 40%. Moreover, the impurity sealability (performance of whether to be able to carry out a seal good, even if impurities, such as an oxide and remains food, exist between the thermoplastic material innermost layers of the zone which should seal) of a thermoplastic material innermost layer was evaluated. Consequently, the container of the example was excellent in the impurity sealability.

Example 2-1

By the same lamination as an example 1-1, the laminated web packaging material of laminated constitution of being shown in FIG. 1 was obtained.

Figure 6:
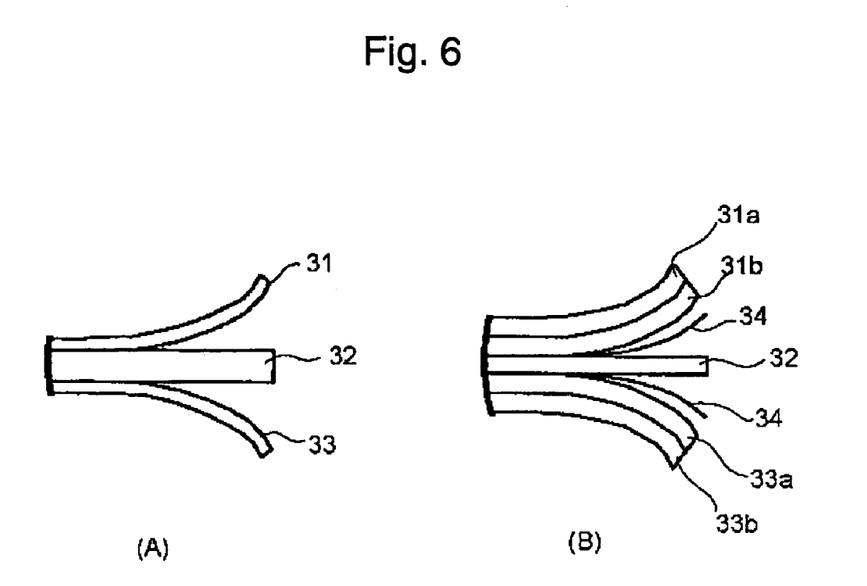
FIG. 6 is an outline sectional drawing showing the lamination of the example of the strip tape used for the paper packaging container of this invention.

By the filling machine shown in FIG. 2, the liquid food filling packaging container of brick shape was obtained using the packaging material and the strip tape 2 of laminated constitution of being shown in FIG. 6. The sealing-surface layer of the strip tape was the material which blended the linear low density polyethylene (mLLDPE) of the narrow molecular weight distribution which was polymerized with the metallocene catalyst, and the low density polyethylene by the high pressure process. The sealing-surface layer was extruded to the PET film, and the laminated strip tape of 10 mm width which comprises of a sealing-surface layer/a PET layer/a sealing-surface layer was obtained. The blended material had average density of 0.915, 96-degree C. of peak melting point, melt flow index of 15, and swelling ratio of 1.49. Evaluation of the seal temperature range of the longitudinal seal in the obtained packaging container and a filling machine and seal strength was performed.

Example 2-2

The packaging material and the brick type paper packaging container were produced like the example 2-1 except having used the thermoplastic material which blended the linear low density polyethylene (mLLDPE) of the narrow molecular weight distribution which was polymerized with the metallocene catalyst, and the low density polyethylene by the high pressure process instead of the low density polyethylene by the high pressure process of the thermoplastic material outermost layer in an example 2-1. The blended thermoplastic material had average density of 0.915, 95-degree C. peak melting point, melt flow index of 17, swelling ratio of 1.5, and 18-micrometer layer thickness. Furthermore, evaluation about the obtained paper packaging container and packaging filling was performed. The seal temperature range expanded no less than 80% about the longitudinal seal.

Example 2-3

The packaging material and the brick type paper packaging container were produced like the example 2-1 except having used for the 8-micrometer polyester film the barrier film which vapor deposited the carbon content silicone oxide (SiOxCy) by the plasma enhanced chemical vapor deposition instead of the aluminum foil in an example 2-1. Furthermore, the same evaluation as the above-mentioned example was performed about the obtained paper packaging container and packaging filling.

Comparative Example 2-1

The packaging material and the brick type paper packaging container were produced like the example 2-1 except having used the low density polyethylene (density=0.920 g/cm$^3$, MI=5.1) by the high pressure process for the thermoplastic material innermost layer and adhesives layer in an example 2-1. Furthermore, the same evaluation as the above-mentioned example was performed about the obtained paper packaging container and packaging filling.

Comparative Example 2-2

The packaging material and the brick type paper packaging container were produced like the example 1 except having used for the adhesives layer in an example 2-1 the film which was laminated with the low density polyethylene by the film blowing, and the adhesive resin as a thermoplastic material innermost layer using the low density polyethylene (density=0.920 g/cm$^3$, MI=5.1) by the high pressure process. Furthermore, the same evaluation as the above-mentioned example was performed about the obtained paper packaging container and packaging filling.

Comparative Example 2-3

The packaging material and the brick type paper packaging container were produced like the example 2-1 except having used the thermoplastic material which blended the linear low density polyethylene (mLLDPE) of the narrow molecular weight distribution from polymerization with the metallocene catalyst, and the low density polyethylene by the high pressure process instead of the thermoplastic material of the innermost layer in an example 2-1. The blended thermoplastic material had average density of 0.915, 95-degree C. of peak melting point, melt flow index of 17, the swelling ratio of 1.3, and 18-micrometer of layer thickness. Furthermore, the same evaluation as the above-mentioned example was performed about the obtained paper packaging container and packaging filling.

Comparative Example 2-4

Instead of the strip tape by this invention in the example 2-1, packaging material and the brick type paper packaging container were produced like the example 1 except having used the conventional strip of an intermediate layer's polyester (PET, and amorphous PET are included) and the double-sided layer of LDPE. Furthermore, the same evaluation as the above-mentioned example was performed about the obtained paper packaging container and packaging filling.

Evaluation of the seal temperature range of the above-mentioned longitudinal seal and seal strength was performed about the examples 2-1, 2-2, 2-3 and the comparative examples 2-1, and 2-2, 2-3 and 2-4. Consequently, it was shown that the examples are superior to comparative examples. For example, when the example 2-1 was compared with the comparative example 2-1, in the example 2-1, the seal temperature range of a longitudinal seal expanded in 100% or more to lower temperature side, good sealable ability was shown, and it was proved that the seal at the time of packaging filling became more easily and simple. Furthermore, when the example 2-2 was compared with the comparative example 2-2 about seal strength, it have improved 30 to 40%. When an example 2-1, and 2, 3 and a comparative example 2-4 are compared, even if the filling packaging speed using the filling machine by FIG. 2 speeds up 70%, the good seal in a longitudinal-seal portion was shown in the example. The workability of packaging filling improved.

Example 3-1

The low density polyethylene (density=0.920 g/cm$^3$, MI=5.1) by the high pressure process was extrusion coated by 330 degrees C. of extrusion temperatures on the paper substrate (weight=320 g/m$^2$) by 20 micrometers in thickness, and the outside thermoplastic material layer was laminated. Then, mLLDPE with the properties parameter of average density of 0.925, 116-degree C. of peak melting point by the differential scanning calorimetry, melt flow index of 10, and swelling ratio of 1.5 was laminated at the inside rear face of a paper substrate by the 35-micrometer layer thickness.

The packaging material was punched to the blank plate for paper packaging containers with creasing lines, subsequently, the edges of the blank plates were welded and the sleeve shape container was manufactured. The container was put into the liquid food filling machine, the bottom portion was folded along with the predetermined creasing line, heat fusion was carried out by hot-air processing, the bottom was formed, and, subsequently the content product was packed from top opening. The top portion was folded along with the predetermined creasing line, heat fusion was carried out by hot-air processing, and the gable top type packaging product was manufactured. The temperature range and seal strength of the top seal of the obtained packaging container were evaluated.

Example 3-2

The packaging material and the paper packaging container were produced like the example 1 except having used the blend polymer which blended the linear low density polyethylene (mLLDPE) of the narrow molecular weight distribution which polymerized with the metallocene catalyst, and the low density polyethylene by the high pressure process instead of mLLDPE of the inside thermoplastic material layer in an example 3-1. The blend polymer of a 35-micrometer layer thickness had the properties parameter of average density of 0.925, 118-degree C. of peak melting point by the differential scanning calorimetry, melt flow index of 11, and swelling ratio of 1.5. Furthermore, the same evaluation as the above-mentioned example was performed about the obtained paper packaging container and packaging filling.

Example 3-3

The packaging material and the paper packaging container were produced like the example 1 except having used LLDPE of the 35-micrometer layer thickness which has the properties parameter of average density of 0.925, 118-degree C. of peak melting point by the differential scanning calorimetry, melt flow index of 11, and swelling ratio of 1.5 instead of mLLDPE of the inside thermoplastic material layer in an example 3-1. Furthermore, the same evaluation as the above-mentioned example was performed about the obtained paper packaging container and packaging filling.

Comparative Example 3-1

The packaging material and the paper packaging container were produced like the example 3-1 except having used the low density polyethylene (density=0.923, MFI=4, 113-degree C. of peak melting point by the differential scanning calorimetry, 1.8 of swelling ratios) by the high pressure process instead of mLLDPE of the inside thermoplastic material layer in an example 3-1. Furthermore, the same evaluation as the above-mentioned example was performed about the obtained paper packaging container and packaging filling.

Comparative Example 3-2

Instead of mLLDPE of the inside thermoplastic material layer in an example 3-1, packaging material and the paper packaging container were produced like the example 3-1 except having used the low density polyethylene (density=0.925, MFI=3, the 110-degree C. of peak melting point by the differential scanning calorimetry, 1.7 of swelling ratio). Furthermore, the same evaluation as the above-mentioned example was performed about the obtained paper packaging container and packaging filling.

An above-mentioned top seal temperature range and its above-mentioned seal strength were evaluated for the examples 3-1, 3-2, 3-3, and the comparative examples 3-1 and 3-2. Consequently, it was proved that examples are superior to comparative examples.

For example, when the example 3-1 was compared with the comparative example 3-1, in the example 3-1, the temperature range of a seal expanded 20% or more, and the seal at the time of packaging filling became more easily and simple. In the example 3-1, the ratio of leakage of samples was 0% about the top seal strength. On the other hand, since pinhole, foaming, the blister, etc. occurred in the fused thermoplastic material layer, 5–10% of the samples of the comparative examples showed leakages.

Moreover, the impurity sealability (performance of whether to be able to carry out a seal good, even if impurities, such as an oxide and remains food, exist between the thermoplastic material innermost layers of the zone which should seal) of a thermoplastic material innermost layer was evaluated. Consequently, those containers were excellent in the impurity sealability.

As the above-mentioned examples proved, this invention shows the following effectiveness.

The packaging material for paper containers of this invention has good performance in an extrusion-laminating properties required in the case of packaging material manufacture, and the converting properties by it, and manufacture of packaging material is easy for it. Packaging material can be heat sealed quickly, tougher seal strength is made possible, and a good seal is obtained, without receiving influence in the temperature of a content product. That is, impurity sealable ability improves and the seal performance is excellent. The container has a non-scalping or a quality preservability.

Moreover, a good seal is obtained also at low temperature also with high temperature, without receiving influence in the temperature of a content product, since a seal temperature range expands at the time of packaging filling. For example, since the seal temperature in a filling machine can be set as temperature lower than the usual temperature, even if the thin film layer of an inorganic oxide, the thin film layer of an aluminum, etc. are used for a barrier layer, a heat damage can be reduced, as a result barrier degradation can be prevented.

In this invention, at the time of a seal, a pinhole, foaming, a blister, etc. do not happen in the thermoplastic material layer for seals, but seal strength can be maintained, and there is no leakage of a liquid content. Therefore, filling packaging to a low cost paper packaging container is easy, and can heat seal quickly. Tougher seal strength is made possible, and a good seal is obtained, without receiving influence in the temperature of a content product, and the container has a non-scalping or a quality preservability.

INDUSTRIAL APPLICABILITY

From the packaging material by this invention, the packaging container in which liquid food, such as cow's milk and a fruits drink, are put can be manufactured.

What is claimed is:

1. A packaging material for making paper containers having an interior comprising at least a thermoplastic material outermost layer, a paper substrate layer, a barrier layer, and a thermoplastic material innermost layer in such order, the innermost layer being adapted to be located closer to the interior of the paper container than the outermost layer when the packaging material is formed into the paper container,
   the thermoplastic material innermost layer containing at least a linear low density polyethylene which has an average density of 0.900 g/mL–0.915 g/mL, a peak melting point of 88° C. to 103° C., a melt flow index of 5 dg/min–20 dg/min, a swelling ratio of 1.4–1.6, and a layer thickness of 20–50-micrometer.

2. A packaging material for paper containers according to claim 1, wherein the thermoplastic material outermost layer contains at least a linear low density polyethylene which has an average density of 0.900 g/mL–0.925 g/mL, a peak melting point of 88° C. to 103° C., a melt flow index of 5 dg/min–20 dg/min, a swelling ratio of 1.4–1.6, and a layer thickness of 10–25 micrometer.

3. A packaging material for paper containers according to claim 1, including an adhesives layer between the barrier layer and the thermoplastic material innermost layer that contains at least a linear low density polyethylene which has an average density of 0.900 g/mL–0.915 g/mL, a peak melting point of 88° C. to 103° C., a melt flow index of 5 dg/min–20 dg/min, a swelling ratio of 1.4–1.6, and a layer thickness of 2–15 micrometer.

4. A packaging material for paper containers according to claim 1, including an adhesive thermoplastic material layer between the paper substrate layer and the barrier layer which contains at least a linear low density polyethylene which has an average density of 0.890 g/mL–0.925 g/mL, a peak melting point of 88° C. to 103° C., a melt flow index of 10 dg/min–20 dg/min, a swelling ratio of 1.4–1.6, and a layer thickness of 10–25 micrometer.

5. A paper packaging container formed from a packaging material comprising at least a thermoplastic material outermost layer, a paper substrate layer, a barrier layer, and a thermoplastic material innermost layer in such order, the innermost layer being located closer to an interior of the packaging container than the outermost layer, the thermoplastic material innermost layer containing at least a linear low density polyethylene which has an average density of 0.900 g/mL–0.915 g/mL, a peak melting point of 88° C. to 103° C., a melt flow index of 5 dg/min–20 dg/min, a swelling ratio of 1.4–1.6, and a layer thickness of 20–50 micrometer;

a strip tape covering a discontinuous section of the thermoplastic material innermost layer between two edges of the packaging material in a liquid tight manner, and     at least a sealing-surface layer of the strip tape containing a linear low density polyethylene which has an average density of 0.900 g/mL–0.915 g/mL, a peak melting point of 88° C. to 103° C., a melt flow index of 5 dg/min–20 dg/min, a swelling ratio of 1.4–1.6, and a layer thickness of 20–100 micrometer.

6. A paper packaging container formed from a packaging material comprising at least an outside thermoplastic material layer, a paper substrate layer, and an inside thermoplastic material layer, in such order, the inside thermoplastic material layer containing at least a linear low density polyethylene, and having an average density of 0.910 g/mL–0.930 g/mL, a peak melting point of 115 degrees °C. or more by differential scanning calorimetry, a melt flow index of 5 dg/min–15 dg/min, and a swelling ratio of 1.45–1.55.

7. The packaging material of claim 1, wherein the thermoplastic material innermost layer is extrusion laminated.

8. The paper packaging container of claim 5, wherein the thermoplastic material innermost layer is extrusion laminated.

9. The paper packaging container of claim 6, wherein the inside thermoplastic material layer is extrusion laminated.

\* \* \* \* \*